United States Patent [19]

Bohannon

[11] Patent Number: 4,790,008

[45] Date of Patent: Dec. 6, 1988

[54] TELEPHONE LINE SWITCH APPARATUS

[75] Inventor: Harold L. Bohannon, Shreveport, La.

[73] Assignees: American Telephone and Telegraph Company, New York, N.Y.; AT&T Information Systems Inc., Morristown, N.J.

[21] Appl. No.: 853,576

[22] Filed: Apr. 18, 1986

[51] Int. Cl.$^4$ ............................................. H04M 1/08
[52] U.S. Cl. ...................................... 379/427; 379/424
[58] Field of Search ....................... 379/427, 424, 436

[56] References Cited

U.S. PATENT DOCUMENTS

| | | | |
|---|---|---|---|
| 1,917,724 | 7/1933 | Kvaal | 379/427 |
| 2,559,651 | 7/1951 | McLarn | 379/424 |
| 3,488,458 | 1/1970 | Tolman | 379/424 |

FOREIGN PATENT DOCUMENTS

| | | | |
|---|---|---|---|
| 71034 | 9/1946 | Norway | 379/424 |
| 168866 | 10/1959 | Sweden | 379/424 |

Primary Examiner—Thomas W. Brown
Attorney, Agent, or Firm—R. F. Kip, Jr.; Harry L. Newman

[57] ABSTRACT

A telephone stand has a housing with a cradle in its top for a handset adapted when placed in the cradle to depress a pair of laterally spaced plungers passing through holes in the housing down into its interior. A line switch is disposed in the housing below and laterally between the plungers. The plungers are coupled to the switch by a Y-shaped piston comprising a crosshead spanning the lateral spacing between the plungers, a pair of tines projecting upwards from laterally opposite ends of the crosshead and having vertical bores therein in which lower portions of the plungers are received, and a laterally central stem extending down from the crosshead and having camming surfaces thereon adapted upon downward displacement of the piston (by downward driving of either of both of the plungers) to wedgingly displace resilient blades in the switch to change switch conditions thereof. A spring passes up through a hollow in the stem to urge the piston upwards and impart to it a floating support which is stabilized by the plunger portions in the tine bores. The tines have upwardly and outwardly facing "L" shaped notches formed in their upper ends to prevent jamming of the downward displacement of the piston when only one of the plungers is driven down.

9 Claims, 5 Drawing Sheets

TELEPHONE LINE SWITCH APPARATUS

FIELD OF THE INVENTION

This invention relates generally to telephone apparatus and more particularly to apparatus of such kind including a line switch for a telephone set and mechanism for actuating such switch.

BACKGROUND OF THE INVENTION

The conventional residential telephone set comprises a handset and a stand providing on its top a cradle for the handset Included in the stand is a line switch and switch actuator means which usually comprises (a) vertically movable plungers passing from the cradle through holes in the stand's housing into its interior, and (b) a motion coupling linkage extending in such interior from the bottoms of the plungers to the switch and responsive to movement of the plungers between up and down positions therefor to shift contacts in the line switch means between open and closed conditions therefor. The operation of such actuator means is such that the weight of the handset in the cradle depresses the plungers to cause the actuator means to maintain the mentioned contacts open or closed as appropriate for the ON-HOOK condition of the telephone set. When, however, the handset is lifted off the cradle, the removal of its weight from the plungers causes the actuator means to change the conditions of the contacts to that appropriate for the OFF-HOOK condition of the set, and for signaling the central office that the set is OFF-HOOK.

In the past, motion coupling linkages of the sort described above have tended to be complex in their action by virtue of converting the original simple vertical movement of the plungers into one or more other linkage movements differing in direction and magnitude from such original movement and from each other. Also such linkages have often had a large number of parts and have, on that account, been expensive. Such characteristics of complexity and high cost are, however, significant disadvantages for telephone sets to have in this era of intense competition for their sales in the market place.

SUMMARY OF THE INVENTION

These and other disadvantages are obviated according to the invention by providing, for intended inclusion in a telephone set, apparatus comprising: a telephone stand having a housing with a cradle in its top for a telephone handset, left- and right-hand laterally spaced plungers passing down from said cradle through guide holes in said housing into its interior, said plungers being vertically movable in said holes between up and down positions, a line switch disposed in said housing below said plungers, and a switch actuating piston disposed in said interior between said plungers and switch and movable between up and down positions, said piston being responsive to downward driving of either or both of such plungers to undergo a corresponding downward translatory displacement adapted by a direct force coupling of said unit with said switch to actuate said switch contacts from one to the other of said open and closed conditions.

According to the invention in one of its aspects, such piston unit includes camming means adapted to so actuate said contacts by wedging displacement of such contacts by said camming means.

According to the invention in another of its aspects, the mentioned downward displacement of the piston is opposed by an upward force productive of a moment of force causing the unit to undergo angular tilting in the lateral-vertical plane, and the apparatus includes tilt counteracting means for precluding such tilting from jamming the downward displacement of the piston.

BRIEF DESCRIPTION OF THE DRAWINGS

For a better understanding of the invention, reference is made to the following description of a representative embodiment thereof, and to the accompanying drawings wherein.

Figure 1:
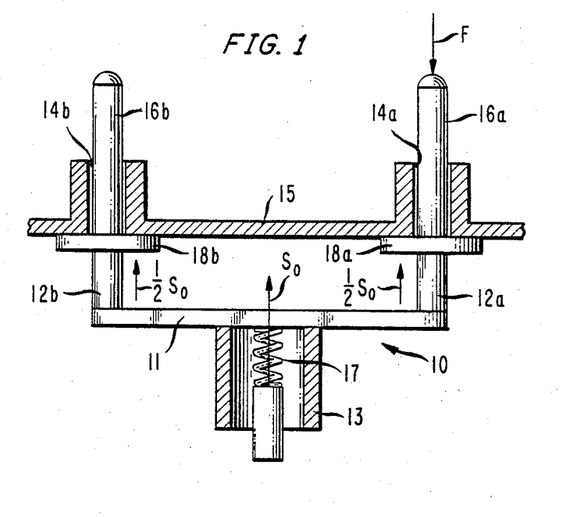
FIG. 1 is a schematic front elevation of a hypothetical line switch apparatus which is not known to be prior art, but which is depicted and discussed herein for purposes of explaining some of the problems overcome by the present invention.
Figure 2:
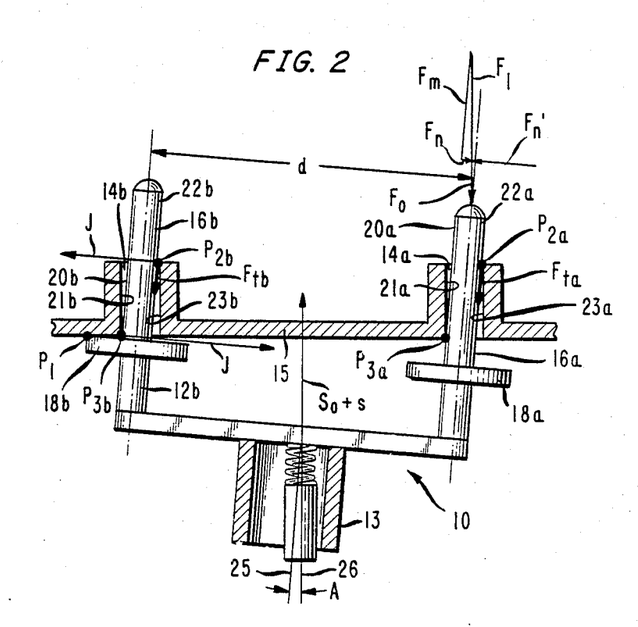
FIG. 2 is a schematic front elevation of the hypothetical response of the FIG. 1 apparatus to downward driving of only one of the plungers of the apparatus.

Referring first to FIGS. 1 and 2, those figures show a hypothetical line switch actuating mechanism in which the plungers are provided by the upper parts of the tines of a fork so that the plungers have no play in relation to the rest of the fork. In the figures, the reference numeral 10 generally designates such a fork comprising a horizontal yoke 11, tines 12a, 12b upstanding from the ends of the yoke, and a hollow stem 13 downstanding from its center. The upper parts of tines 12a, 12b are received in guide holes 14a, 14b in a telephone stand housing 15 to form plungers 16a, 16b projecting upward above the bottom of a cradle in the top of housing 15. Plungers 16 are adapted to be depressed by the weight of a handset in such cradle. Fork 10 is biased upwards by a compression spring 17 in stem 13, but upward movement of the fork is stopped by the abutting against the bottom of housing 15 of flanges 18a, 18b carried by tines 12a, 12b and of larger diameter than holes 14.

Fork 10 is intended to be operated by a downward force on plungers 16 so as to be driven down in translation against the upward bias force of spring 17 for a distance sufficient for stem 13 to actuate contacts included in a line switch (not shown) to closed or open condition as required. It is necessary for commercial acceptability of any such line switch actuating mechanism that it operate without jamming to close or open such contacts whether the downward force is applied evenly to both plungers or exclusively to one or the other of them. The fork of FIGS. 1 and 2 does not meet this criteria for commercial acceptability as will be made clear from the following analysis.

Assume that spring 17 applies to yoke 11 an upward force S having a value $S_0$ in the condition shown in FIG. 1 where flanges 18 abut against housing 15, and in which the spring has its greatest upward extension to be in the least compression. The force $S_0$ can be considered as divided into two forces each of value $\frac{1}{2}S_0$ and acting upward in tines 12a, 12b to hold both of flanges 18a, 18b flush against housing 15. Assume further that there is applied to right-hand flange 16a a downward force F which is generated by, say, pressing down on the plunger with a finger, and which progressively increases from an initial value of zero.

So long as F is less than $\frac{1}{2}S_0$, fork 10 will have the angular and translational relation to housing 15 which is shown in FIG. 1 for the reason that, in the right-hand tine 12a, the resultant of the upward and downward forces $\frac{1}{2}S_0$ and F is a net upward force ($\frac{1}{2}S_0$-F) which holds flange 18a against housing 15. In the case of fork 10 the "force equation" (i.e., the equation setting out that the algebraic sum of the forces on a stationary object must equal zero) is satisfied because the upward active force $S_0$ is equally and oppositely opposed by the sum of the active downward force F, a reactive downward force ($\frac{1}{2}S_0$-F) from housing 15 on flange 18a and a reactive downward force $\frac{1}{2}S_0$ from housing 15 on flange 18b. Also the "moments equation" (i.e. the equation that, for a stationary object, the algebraic sum of the moments of force on such object about any pivot point must equal zero) is also satisfied because the moments of force about the longitudinal center point of yoke 11 are self-evidently equal and opposite to each other.

FIG. 2 shows among other things what happens when the down force F is greater than the up force $\frac{1}{2}S_0$ on tine 12a, but has not yet exceeded (it is first assumed) the full up force $S_0$ of spring 17. Since F is less than $S_0$, the Force F cannot move fork 10 down in translation. From the moments viewpoint, however, if d is the distance between the respective centerlines of tines 12a and 12b and if the point of contact $P_1$ of flange 18b with housing 15 is considered to lie on the centerline of tine 12b (i.e., the small offset of point $P_1$ from that centerline is neglected), then force F exerts about pivot point $P_1$ a clockwise (CW) moment equal to F×d which is greater than $\frac{1}{2}(S_0 d)$ because F is greater than $\frac{1}{2}S_0$. On the other hand, the force $S_0$ from spring 17 on yoke 11 exerts on fork 10 a counterclockwise (CCW) moment about point $P_1$ equal in value to $S_0 \times \frac{1}{2}d$ or in other words $\frac{1}{2}(S_0 d)$. Since the mentioned clockwise moment is greater than the counterclockwise one, there is on fork 10 a net clockwise moment which causes a clockwise angular tilting of fork 10 as shown in FIG. 2.

Spring 17 mounts the fork 10 in a floatable manner so that the fork is laterally (i.e., horizontally) shiftable in position in translation. Hence the fork may be initially laterally positioned relative to housing 15 over a range of positions extending from (a) that at which the left-hand sides 20a, 20b of plungers 16 bear against the left hand sides 21a, 21b of holes 14, through (b) the position at which the centerlines of the plungers 16 coincide with those of holes 14, and to (c) the position at which the right-hand sides 22a, 22b of plungers 16 bear against the right-hand sides 23a, 23b of holes 14. An effect of the described angular tilting of fork 10 is that, wherever fork 10 is initially positioned relative to housing 15 within such range, the fullest possible tilting of the fork brings the fork and housing to their relative positioning shown in FIG. 2 in which the right-hand sides 22 of plungers 16 make contact at the top of holes 14 with the right-hand sides 23a thereof at contact points $P_{2a}$, $P_{2b}$, and in which the left-hand sides 20a, 20b of plungers 16a, 16b make contact at the bottom of holes 14 with the left-hand sides 21a, 21b thereof at contact points $P_{3a}$, $P_{3b}$.

The fork 10 may tilt through an angular range from zero to a maximum angle A which is the upper angular limit of tilt. The value of A is determined by the clearance of the plungers 16 in the holes 14. That is, if the plungers and the holes have respective radii of $r_1$ and $r_2$ and if h is the vertical height of the holes, then it will be evident from FIG. 2 that A is the angle whose tangent is equal to $2(r_2-r_1)/h$ or, in other words, $A = \tan^{-1} 2(r_2-r_1)/h$. The angular tilt of fork 10 cannot exceed angle A so long as the fork is or behaves as a rigid structure, and such rigidity is herein assumed. The angle A of tilt of fork is the same as the maximum value of angular play of plungers 16 within holes 14. As a general rule of design, it is desirable that such play be minimal in order to assure that the positioning and movement of the plungers can be well controlled.

The tilting of fork 10 to angle A (see FIG. 2) results in some linear displacement downwards of the center of yoke 10 against the bias of spring 17 so that, upon attaining angle A, the upward force from the spring has increased from $S_0$ to $S_0 + s$. Then, if we also assume, as before, that pivot point $P_1$ is on the centerline of plunger 16b, consideration of the steady state force and moment equations for the fork-housing structure of FIG. 2 indicates that a tilt of fork 10 to the full amount A will be produced when force F has a value $F_0$ equal to $\frac{1}{2}(S_0+s)$ so as to be only slightly greater than one-half the initial spring force $S_0$. For that value of $F = \frac{1}{2}(S_0+s)$, the equation for the moments of force about, say, point $P_1$ is essentially satisfied by solely the moments produced by the forces $S_0+s$ and F, and it follows from such fact that no moment-producing forces are produced at points $P_{2a}$, $P_{2b}$, and $P_{3a}$ and $P_{3b}$. In other words, when force F is only slightly greater than $\frac{1}{2}S_0$, plungers 16 will be essentially in non-pressure touching relation at points $P_{2a}$, $P_{2b}$, $P_{3a}$, $P_{3b}$ with the housing 15.

Any increase in value of Force F above $\frac{1}{2}S_0$ is incapable (so long as fork 10 and housing 15 are rigid) of increasing the tilt of fork 10 beyond angle A. Further, any such increase which does not raise F to a value exceeding $S_0+s$ will not result in any linear displacement downward of fork 10 because force F must reach that value in order to overcome the bias of spring 17 against linear displacement. If, however, force F does increase to such value, that increase in Force F will produce in the system a clockwise (CW) moment of force which must be opposed by one or more CCW moments to satisfy the steady state moments equation for the system.

To appreciate what those CCW moments are, assume that F has increased from its previous value $F_0$ of $\frac{1}{2}(S_0+s)$ by an amount $F_1$ also equal to $\frac{1}{2}(S_0+s)$ so that F now just equals $S_0+s$. Consider the increase $F_1$ as a vertical force applied to plunger 16a in addition to the original force $F_0$ thereon. Now resolve force $F_1$ into a vector component $F_m$ aligned with the centerline of plunger 16a and a vector component $F_n$ normal to that centerline. (See FIG. 2). Component forces $F_m$ and $F_n$ can be considered to operate independently on Fork 10.

Taking up first the force $F_m$, since it is in line with plunger 16a, it will, apart from friction, produce no reactive forces at point $P_{2a}$ or elsewhere in the region of passage of plunger 16a through hole 14a. Force $F_m$ will, however, produce about point $P_{3b}$ a CW moment of value $F_m \times d$ which, to satisfy the steady state moments equation, must be opposed by a CCW moment generated by mostly horizontal forces J, acting at points $P_{2b}$, $P_{3b}$ as shown in FIG. 2. Such CCW moment has a value of about hJ, where h is the height of holes 14. Since $F_m d = hJ$, and since h is substantially smaller than d, the forces J are substantially greater than $F_m$ to produce substantial friction at point $P_{2b}$ at the side of hole 14b between the plunger 16b and housing 15.

Now coming to the force $F_n$, it will drive plunger 16 against the right side 23a of the hole 14a to produce friction therebetween, and force $F_n$ will also produce about point $P_{3b}$ a CW moment equal to about $hF_n$. That moment, however, is exactly opposed by a CCW moment produced by a force $F'_n$ acting from housing 15 against plunger 16a equally and opposite to force $F_n$, force $F'_n$ being generated as a reaction to force $F_n$, and the value of such CCW moment being $hF'_n$. It will be evident that the value of that moment is much less than the value of the described moment hJ generated by the contact shown in FIG. 2 of plunger 16b with the opposite sides of the hole 14b.

The conclusion to be drawn from the foregoing is that, of the two plungers 16 generating moments resisting tilting of fork 10 beyond angle A in response to increasing values of Force F applied to only one of those plungers, the moment generated by the plunger to which the force F is not applied is much greater than the moment generated by the plunger to which force F is applied.

Consider now what happens when F is increased to a value greater than $S_0 + s$ in an endeavor to produce a linear displacement of fork 10 downward beyond that produced by tilting of the fork to angle A.

An important thing to note is that any such linear displacement of the fork cannot be wholly vertical but must be in a path 25 angularly displaced from the vertical path 26 for the fork by the angle A. The reason why fork 10 must follow path 25 is that the CW moment produced by force F drives fork 10 to angle A and holds it there against any tendency of the fork to tilt away from angle A towards or to the vertical. At the same time it is evident that it is preferable that the linear displacement of fork 10 be vertical or as close to it as possible. Hence, considering angle A as the angle of play, equal to $\tan^{-1} 2(r_2-r_1)/h$, of plungers 16 in holes 14, it follows that such angle of play should be made as small as practical either by decreasing $r_2-r_1$ or by increasing h.

We have predicated an attempt to drive fork 10 in path 25 by increasing the scalar component $F_1$ of force F to raise F to a value greater than $S_0 + s$ to thus presumably overcome that upward bias force and produce a linear downward displacement of fork 10 in such path 25. Will any such linear displacement of fork 10 in fact result from such increase in $F_1$? The answer is that no such displacement of fork 10 will result for reasons as follows.

Consider the effects at points $P_{2a}$ and $P_{2b}$ of the application of the increased force component $F_1$ to plunger 16a at its top. The in-line vector component $F_m$ of $F_1$ will act along the centerline of plunger 16a to tend to push it down, but the normal vector component $F_n$ of $F_1$ will create a friction force (equal to $F_n$ times the coefficient of friction at point $P_{2a}$ between plunger 16 and housing 15) which opposes and prevents such downward movement of the plunger until the down tangential force $F_{ta}$ on the plunger at point $P_{2a}$ and tangential to the right side of the plunger exceeds the friction force at point $P_{2a}$ between the plunger and housing. The value of force $F_{ta}$ in relation to the in-line component force $F_m$ can be readily calculated by the use of the relation that the moments of the two forces about point $P_{2b}$ must be equal each other or, in other words, $F_m \times (d-r_1) = F_{ta} \times d$, such that $F_{ta} = F_m \times (d-r_1)/d$. Inasmuch, however, as $r_1$ is small compared to d, the force $F_{ta}$ is only slightly smaller than the force $F_m$ itself, and force $F_{ta}$ accordingly can easily overcome the friction between plunger 16a and housing 15 so that the fork 10 could easily be driven linearly downward if movement of plunger 16a were the only consideration.

The situation is not the same for the left side of fork 10. Since the force J at point $P_{2b}$ is substantially greater than the component $F_m$ which is in turn substantially greater than the normal component force $F_n$ on the right side of the fork, the friction force produced by force J between plunger 16b and housing 15 is much greater than that produced (as earlier described) between plunger 16a and that housing. If such friction force is to be overcome, it must be done by a down tangential force $F_{tb}$ produced by the in-line component force $F_m$ and acting at point $P_{2b}$ so as to be tangential to the right surface of plunger 16b. The value of force $F_{tb}$ in relation to force $F_m$ can be calculated by using the relation that the moments of both forces about point $P_{2a}$ must be equal. That is, $F_{tb} \times d$ must equal $F_m \times r_1$ so that $F_{tb}$ must equal $F_m \times r_1/d$. Because however $r_1$ is much smaller than d, the force $F_{tb}$ is much smaller than the force $F_m$.

Taking into account the facts discussed above of (a) the relative largeness of the friction force between plunger 16b and housing 15 compared to that between plunger 16a and the housing and, also, (b) the relative smallness of the down tangential force $F_{tb}$ available at point $P_{2b}$ to overcome the friction thereat as compared to the down tangential force $F_{ta}$ available at point $P_{2a}$ for overcoming friction, it turns out that, for all practical values of angle A, as the driving force F on only one plunger is increased above $S_0 + s$ so as in theory to be able to linearly drive fork 10 down against the up bias force $S_0 + s$, such force F nonetheless is incapable of producing enough down force at the other plunger to overcome the friction between it and the housing at the point of contact therebetween. The result is that fork 10 is held stationary at that point relative to housing 15 so that no downward linear displacement of fork 10 in path 25 is possible in response to application of driving force F on only one plunger. The result just stated obtains irrespective of which plunger the force F is applied to, and such result also obtains irrespective of by how much the force F is increased above the biasing force $S_0 + s$. While it has been assumed up to now that the fork 10 is a completely rigid structure, the same result obtains when fork 10 is non-rigid so that, say, its tines are resiliently bendable in deformation relative to yoke 11. The only difference is that, for such non-rigid case, a force F of sufficient magnitude may be able to tilt the yoke 11 relative to the horizontal through an angle which is greater than the angle A as it has been defined herein.

To summarize the foregoing discussion and the conclusions which can be drawn therefrom, in line switch actuating structures of the kind shown in FIGS. 1 and 2 wherein the cradle plungers are received with clearances in holes in a housing and are upper integral parts of the tines of a fork or counterpart structure it will happen that, when it is attempted to impart a linear downward displacement to the structure by applying a downward driving force to either one (but not both concurrently) of the plungers, the structure will jam by lock-up of the other plunger in its hole within the housing and, on that account, no such linear downward displacement of the structure can be obtained.

Such lock-up problem is overcome by the exemplary embodiment of the invention which is shown in FIGS. 3-6 and which will now be described.

Figure 4:
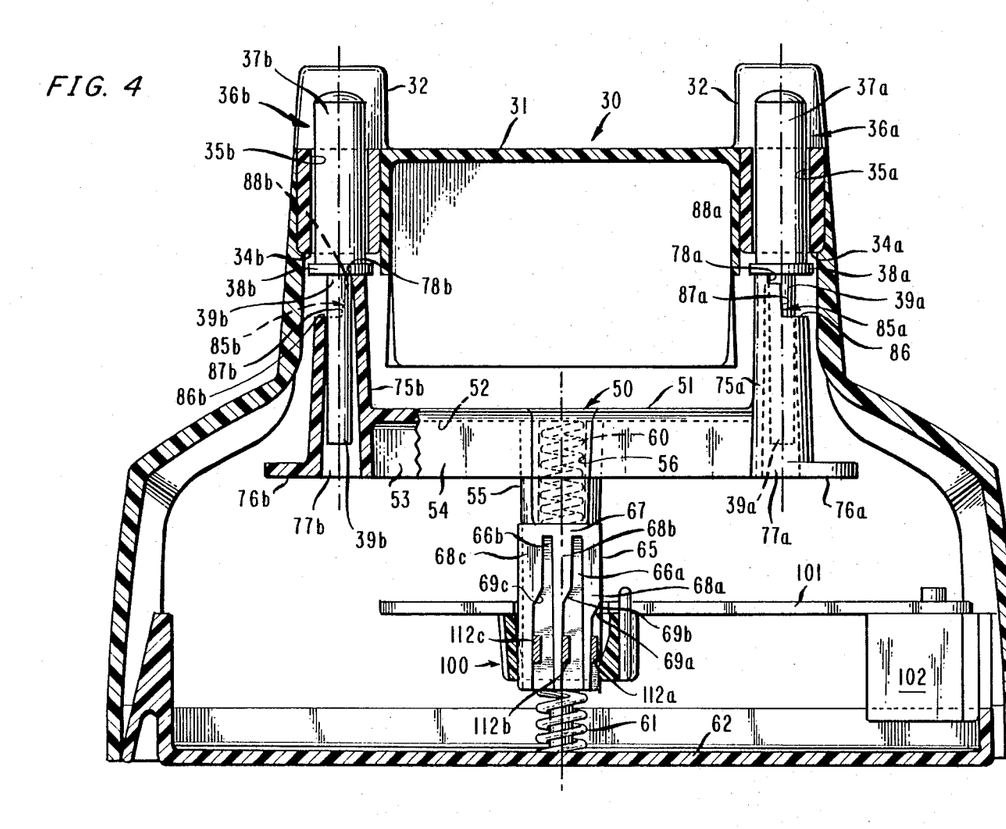
FIG. 4 is a schematic front elevation of the FIG. 3 embodiment at an intermediate stage in the depression of such plunger thereof.
Figure 5:
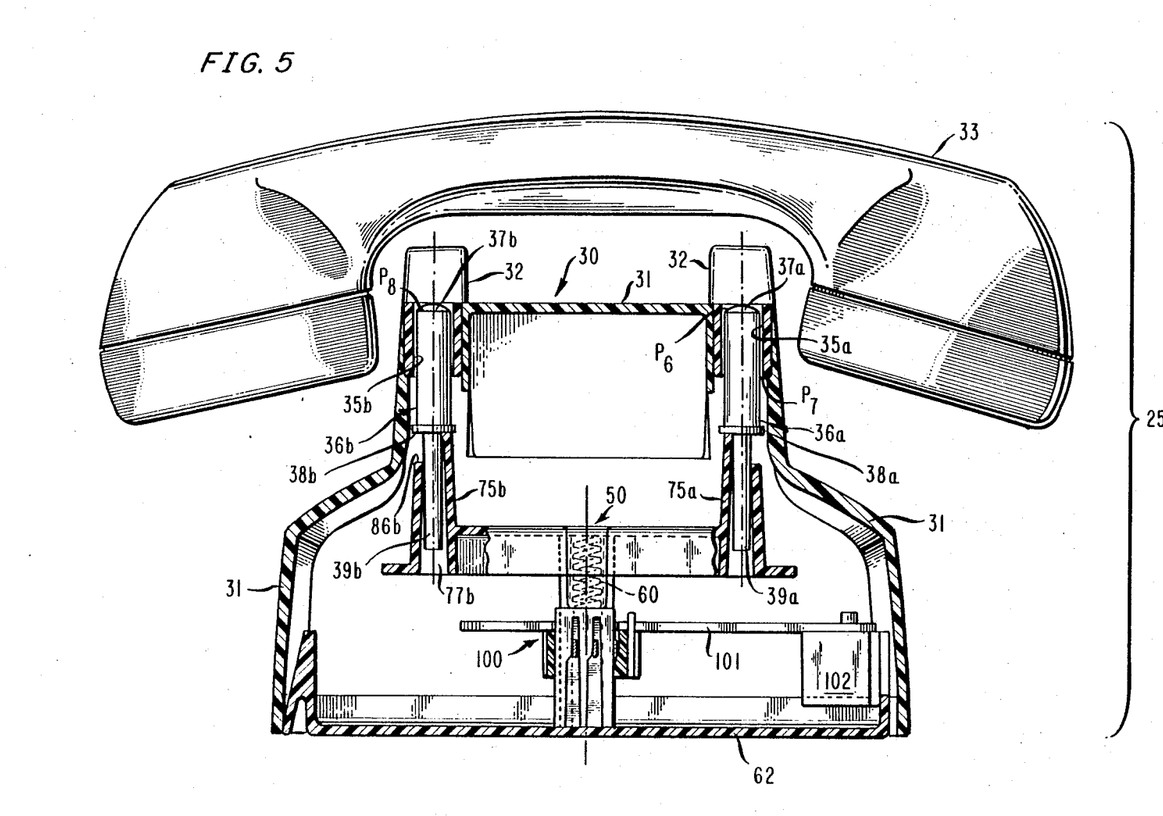
FIG. 5 is a schematic front elevation in cross-section of the FIG. 3 embodiment at an end stage in the depression of such plunger thereof; and, FIG. 6 is a plan view of a line switch constituting one of the components of the FIG. 3 embodiment.

Referring to these figures and particularly to FIG. 4, the reference number 30 generally designates a telephone stand having a synthetic resinous housing 31 with a cradle 32 at its top for a telephone handset 33 (FIG. 5). Stand 30 and handset 33 are parts of the same telephone set 25 (FIG. 5).

Extending vertically down through housing 31 (FIG. 4) from its cradle region to its interior are laterally spaced circular-cylindrical guide holes 35a and 35b formed in the housing and having bottom openings around which the housing 31 provides annular surface portions or seats 34a and 34b. Guide holes 35a and 35b have therein respective synthetic resinous plungers 36a and 36b. The plungers 36a and 36b are constituted of (a) upper circular-cylindrical rod portions 37a, 37b fitting with a clearance within the holes 35a, 35b, (b) annular flange portions 38a, 38b surrounding the bottom ends of rod portions 37a, 37b and of greater diameter than holes 35, and (c) lower circular-cylindrical pin portions 39a, 39b coaxial with, and extending vertically downward from, the rod portions 37a, 37b.

Disposed in housing 31 below the bottom openings of holes 35a, 35b is a Y-shaped switch-actuating piston unit 50 which is a single integral molded plastic part. One element of unit 50 is a crosshead 51 which, to either side of its laterally central region, is of rectangular upside-down "U" cross section in longitudinal-vertical planes so as to consist of an upper horizontal web 52 and back and front vertical webs 53, 54 joined to longitudinally opposite edges of web 52.

Extending down from web 52 in its laterally central region to pass between, and be joined to, webs 53 and 54 is a vertical stem 55 having formed therein a circular cylindrical bore 56 running from an opening therefor at the stem's bottom all the way up through the stem to web 52 which provides a top closure for the bore. Received within bore 56 is a helical compression spring 60 of which the top bears against web 52 and the bottom encircles a post 61 upstanding from the base 62 of the stand 30.

Referring to the extension of stem 55 below crosshead 51, the lower part of such extension is built up to have in front of bore 56 a block 65 of generally rectangular shape and projecting forwardly (i.e., up out of the plane of the drawing of FIG. 4) from the upper part of the mentioned extension. Extending longitudinally into block 65 from its front opening are vertical slots 66a, 66b which are open at their bottoms but are closed at their tops by a bridge 67 of material extending across the top of block 65. Slots 66a and 66b are laterally separated from the right- and left-hand outer sides of block 65 by the outer partitions 68a and 68c, and the two slots are separated from each other by an inner or central partition 68b. The right-hand walls of the partitions 68a, 68b, 68c have wall surfaces 69a, 69b, 69c which are inclined to have a rightward slant in the upward direction, and those inclined surfaces are adapted to act as camming surfaces providing a wedging action as later described. Camming surfaces 69b and 69c are above camming surface 69a.

The crosshead 51 of piston 50 serves as a yoke joining a pair of tubular tines 75a, 75b disposed outward of the right- and left-hand outer ends of the crosshead and projecting from the bottom of such crosshead vertically upward beyond the top thereof. The tines 75a, 75b are joined at their bottoms to shelf-like feet 76a, 76b extending outward from the laterally outward ends of crosshead 51 at its bottom. The two tines 75 have respective axes laterally spaced by the same amount as the respective axes of the guide holes 35. Extending entirely through the tines 75a, 75b coaxial with their axes are vertical conically tapered bores 77a, 77b having diameters which have a smooth convergent taper in the upward direction almost to the top of the bores. At such top, however, shallow inturned arcuate rims 78a, 78b project into the bores 77a, 77b to cause a small but abrupt decrease in their diameters over the vertical extents of such rims. The inner faces of such rims are circular cylindrical journal surfaces coaxial with the central axes of such bores and adapted to make a flush fit with the circular cylindrical surfaces of the pin sections 39a, 39b of the plungers 36a, 36b.

The tines 75a, 75b at their upper ends are cut away to have "L" shaped notches 85a, 85b formed in the outer sides of such upper ends. With respect to those notches, the horizontal arm of the "L" shape is formed by horizontal, upwardly presented lower faces 86a, 86b extending around bores 77a, 77b over an arc of slightly less than 180 degrees. The "vertical" arm of the "L" shape is formed by diagonal facings 87a, 87b extending from such lower arcuate faces vertically upward at an inward slant to terminate at faces 88a, 88b which are at the very top of the tines, and which are horizontal upwardly-presented faces extending around the bores 77a, 77b over an arc of slightly less than 180 degrees.

Figure 3:
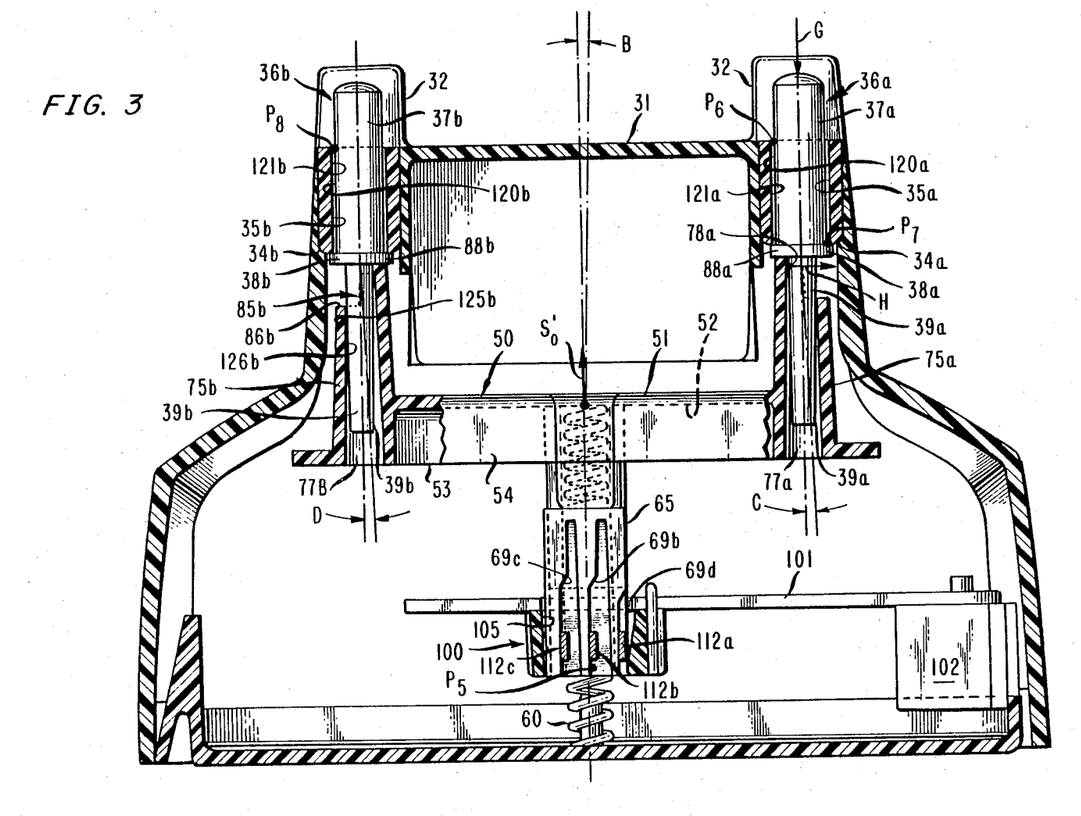
FIG. 3 is a schematic front elevation in cross-section of an exemplary embodiment of apparatus according to the invention at an initial stage in the depression of a plunger of such embodiment.

As shown in FIGS. 3, 4 and 5, the pin portions 39a, 39b of the plungers 36a, 36b are received in the bores 77a, 77b of the tines 75a, 75b of the piston unit 50. If notches 85 were absent so that inturned arcuate rims 78 closed upon themselves to form circular openings in the tops of bores 77, such pin portions would have a close sliding fit within such openings. Because, however, of the presence of notches 85, the pin portions have both angular and translational play within the bores 77 in the vertical extent of rims 78.

The piston 50 cooperates with a line switch 100 disposed in the interior of stand housing 31 below the plungers 36. Switch 100 is affixed to the underside of a printed wiring board 101 mounted to such housing by a bracket 102 and other support means (not shown). The switch 100 comprises (FIG. 6) a molded plastic casing 103 having at its front a hoop 104 surrounding the forward part of an aperture 105 which passes vertically through both the switch 100 and the board 101, and which, in horizontal cross section, has the shape at the front of a half-cylinder and at the rear, of a rectangle. The lower part of the stem 55 of piston unit 50 is received in aperture 105 to be vertically movable therein. Aperture 105 serves as a guideway for translational motion up and down of the stem 55, the lower part of the stem being held away from the inner side of hoop 104 by nubs 106 spaced at ninety degree intervals around the inside of the hoop. Within the aperture, the stem is constrained to follow fairly closely a predetermined path for translational up and down movement of the piston unit 50, but, at the same time, the aperture permits some angular and translational play therein of the stem 55.

Molded into the plastic casing 103 of the line switch are the base ends of (a) a first pair of mutually confronting horizontally extending blades 110a, 111a constituted of a resilient electroconductive material such as phosphor-bronze, (b) a second pair 110b, 111b of such blades, and (c) a third pair 110c, 111c of such blades. Of the elements just mentioned, the blades designated 111a, 111b, 111c are relatively short while those designated 110a, 110b, 110c are relatively long and have relatively thick pads 112a, 112b, 112c at their outer free ends. As shown (FIG. 6), the pads 112a, 112b, 112c are disposed adjacent to the right-hand walls of the partitions 68a, 68b, 68c of the camming block 65 of the stem 55. The long blades 110a, 110b, 110c carry contact portions 113a, 113b, 113c and the short blades 111a, 111b, 111c carry corresponding contact portions 114a, 114b, 114c each adapted to make and break contact with its counterpart contact portion on the confronting long blade. The described blades and contact portions thus together provide three pairs of switch contacts 115a, 115b, 115c adapted to be changed between open and closed conditions thereof.

OPERATION AND USE OF THE EMBODIMENT

Figure 6:
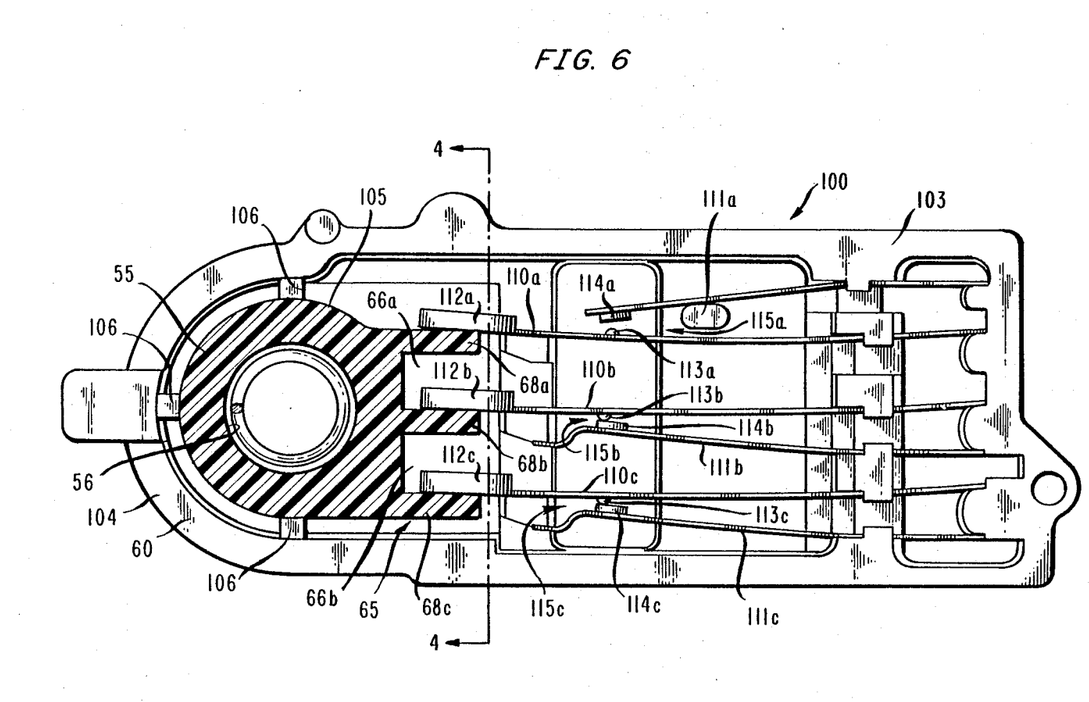

The positions shown in FIG. 6 for the switch contacts 115 are those assumed by such contacts when the handset 33 (FIG. 5) is entirely removed from the cradle 32 so that the telephone set 25 is in OFF-HOOK condition. For that condition, the camming surface 69a (FIG. 4) on the lower end of piston stem 55 is above the pad 112a of switch contacts 115a. Similarly the camming surfaces 69b and 69c are above the pads 112b and 112c of the switch contacts 115b and 115c respectively corresponding to those camming surfaces. Hence, such ON-HOOK condition of telephone set 25 is characterized (as shown in FIG. 6) by an open condition for switch contacts 115a but a closed condition for switch contacts 115b and 115c.

When telephone set 25 is in such OFF-HOOK condition, spring 60 (FIG. 3) presses up against a laterally central region of crosshead 51 of piston 50 so as to support the piston and plungers from beneath and to impart to the piston an upward yieldable bias force driving the tines 75 up to cause their upper faces 88 to urge the annular flanges 38 of plungers 36 against the annular seats 34 therefor provided by the stand housing 31. Once the plunger flanges 38 thus press against such seats 34, upward movement of the piston 50 and the plungers 36 is stopped and the bias force from spring 60 yieldably maintains both the piston and the plungers in fully up position.

Note in such connection that the only support which piston unit 50 receives from underneath is from the spring 60 which is angularly bendable, and the top of which is free to yieldably move up and down. Accordingly the piston unit 50 has a support which is floating in the sense that the unit can undergo shifts in translational position and can, moreover, angularly tilt. It will be appreciated that, with upward force being applied from beneath to piston 50 by spring 60 and downward force being applied from above to that same piston in the form of the down reactive forces exerted by the housing seats 34 on the top faces 88 of the tines 75 of the piston, the floating support it has in housing 31 is inherently unstable in the sense that those up and down forces would, if left alone, cause the piston 50 to go bottom side up by angular rotation about a horizontal lateral axis of roll. The floatingly supported piston is, however, stabilized against such tendency to up end by the presence in the tine bores 77 of the plunger pin portions 39 and, most particularly, by the fact that the bottoms of those pin portions are below the level at which the top of spring 60 presses upward against the top web 52 of piston crosshead 51.

Assume now that handset 33 is replaced in the cradle 32 in such manner that it lies horizontally as it moves down into the cradle. In that case, plungers 36a, 36b are driven by the handset's weight downward by the same amount in the same time until further plunger movement is arrested by the handset contacting the bottom of its cradle. Such downward driving of the plungers causes a downward displacement of the piston unit which is prevented by the equal down movements of the plungers from undergoing any substantial angular tilting. As the piston undergoes such downward displacement, the pad 112a and then the pads 112b, 112c in the line switch 100 are sequentially contacted by, respectively, the camming surfaces 69a, 69b, 69c of the camming block 65 such that those surfaces wedgingly displace such pads in a direction which is rightward (FIG. 6) with reference to the direction from the rear to the front of the line switch. When such pads are so rightwardly displaced, they cause corresponding rightward resilient deflections of the free ends of the blades 110a, 110b, 110c so as, in the case of switch contact 115a, to actuate it from open to closed condition and, in the case of switch contacts 115b, 115c, to actuate each of them from closed to open condition. With such actuations having taken place, telephone set 25 is put into ON-HOOK condition and remains so until handset 33 is again lifted off of cradle 32. Upon such lifting, spring 60 drives piston 50 and plungers 36 up to again establish the operating conditions therefor initially described. In the course of such upward displacement of the piston, the camming surfaces 69 are disengaged from the pads 112 of line switch 100 to permit the blades 110 to spring back to their original undeflected positions to thereby restore the switch contacts to open and closed conditions corresponding to the ON-HOOK condition for set 25.

From the foregoing, it will be appreciated that the line switch apparatus shown in FIGS. 3-6 has the advantages of simplicity, reliability, durability and low cost for the reason among others that the apparatus employs just one movable part (i.e., piston 50) for converting the up and down translational movements of the plungers 36 into actuation of the line switch 100. Simplification of operation is obtained by the fact that such actuation is effected by what is essentially (a) a single combined linear up and down movement of the parts 36 and 50 which do the actuating (such movement being a single one because plungers 36 and piston unit 50 move together), in combination with (b) the camming arrangement which is provided by camming surfaces 69a–69c and contact blades 110a–110c cammed thereby, and by virtue of which arrangement such linear up and down movement is directly applied to the line switch to produce by a simple wedging action an opening or closing as appropriate of the switch contacts 115a, 115b, 115c. By virtue of having ones of such camming surfaces at different heights, the changing of those contacts between open and closed condition may be caused to take place at different times in the full downward or upward movement of the plungers and piston unit if such different timings are required for proper operation of the electrical circuitry of telephone set 25.

We come now to a consideration of the operation of the embodiment of FIGS. 3-6 when downward force is applied to only one of the plungers 36. As earlier stated in connection with the hypothetical line switch apparatus of FIGS. 1 and 2, it is necessary for commercial acceptability of a line switch actuating mechanism that it operate without jamming to close or open the line switch contacts controlled thereby whether downward force is applied evenly to both of the plungers or exclusively to one or the other of them. Having first treated above of the instance where downward force is applied evenly to both plungers, we now assume that downward force is applied only to the right-hand plunger 36a. Since, however, the line switch apparatus of FIGS. 3-6 is bilaterally symmetrical, the same results will obtain mutadis mutandis in the case when downward force is applied only to the left-hand plunger 36b.

Assume that such downward force on right-hand plunger 36a is a force G (FIG. 3) which initially is greater than 0.5 times but less than 1.0 times the upward biasing force $S_0'$ exerted by compression spring 60 on piston unit 50. From the analysis already given in connection with FIGS. 1 and 2, it is evident that there will be exerted on piston unit 50 a net CW moment of force causing CW angular pivoting of the unit in the lateral vertical plane through a small angle B about a pivot point $P_5$ which may be vertically located above about as shown (FIG. 3) and which is a floating point because of the floating support given piston unit 50 by the spring 60.

By virtue of that floating support, piston 50 can have (like the fork of FIGS. 1 and 2) an initial lateral translational position relative to housing 31 which can be anywhere within a range of such positions. Moreover, the plungers 36 can have various angular and translational positions relative to housing 31 within the guide holes 35 for the plungers. Assume, however, for convenience of analysis, that, when force G is first applied, (a) plunger 36a is wholly vertical with the left side 120a of its rod section 37a being in line contact with the left side wall surface 121a of guide hole 35a over the full height of the guide hole, (b) plunger 36b is similarly wholly vertical with the left side 120b of its rod section 37b being in line contact with the left side wall surface 121b of guide hole 35b over the full height of the latter guide hole, and (c) piston 50 is so located within its mentioned range of lateral positioning that the inturned rim 78a at the top of right-hand tine 75a is in pressureless contact with the left side of the circular cylindrical surface of the pin section 39a of the plunger 36a.

Under the assumed conditions just described, the mentioned CW angular pivoting or tilting of piston 50 results in a rightward displacement by an incremental amount of the top inturned rim 78a of the bore 77a in tine 75a and, accompanying such displacement, a pressing by such rim 78a with a rightward force H against the top left side portion of the pin section 39a of plunger 36a so as to produce an incremental rightward displacement of that portion. If pin section 39a were to fit in tine bore 77a with no clearance so that plunger 36a was angularly fixed relative to piston unit 50, such rightward displacement would bring a top right portion of the plunger's rod section 37a into contact with a top right portion of the wall of guide hole 35a so as to lead to results similar to those discussed in connection with FIGS. 1 and 2 where the plungers are angularly fixed in relation to the rest of the fork structure. In the case, however, of the embodiment of FIGS. 3-6, the plungers 36 are angularly adjustable over a range relative to piston unit 50 by virtue of the fact that the tine bores 77 are tapered as shown and throughout their tapers are of greater diameter than the plunger pin sections 39a in such bores except for the short lengths of such bores which are occupied by the mentioned rims 78 (and over which lengths the bore diameters mate with the diameters of the pin sections). Hence, in such embodiment, the mentioned incremental rightward displacement of plunger 36a produces an angular adjustment thereof relative to piston unit 50. The nature of the adjustment is that, while the left side of rod portion 37a of plunger 36a remains in contact at point $P_6$ with the left side of guide hole 35a at its top, the pin section 39a of plunger 36a is driven by the mentioned rightward force H so as to bring a bottom right side portion of rod section 37a into contact at point $P_7$ with the bottom right wall portion of guide hole 35a. That is, plunger 36a angularly pivots CCW about the point $P_6$ until such pivoting is arrested by the coming into contact of such right side portion of the plunger's rod section with such right side wall portion of the guide hole. Note that, in contrast to the arrangement of FIGS. 1 and 2, such pivoting of the plunger is in an angular direction (i.e., CCW) the opposite of the direction of the CW angular tilting of piston unit 50 which induces such pivoting of the plunger.

When the angular pivoting just described of plunger 36a within its guide hole 35a has been arrested by the simultaneous contacting of top left and bottom right portions of the plunger at the points $P_6$ and $P_7$, respectively, with, respectively, top left and bottom right side portions of guide hole 35a (as shown in FIG. 3), the plunger will be cocked in its guide hole, at a small angle C relative to the axis of such hole, and in pressure contact with opposite sides of the hole. Such will be the condition ultimately reached by the plunger in response to application of force G irrespective of the initial positioning of piston 50 within its floating range of positions. From the analysis given in connection with FIGS. 1 and 2, it will be evident that the tangent of angle C is equal to $2(r_2-r_1)/h$ where $r_2$ and $r_1$, are, respectively, the radius of the rod section 37a of the plunger and the radius of the guide hole 35a, and where h is the height of that guide hole. Of further interest is the fact that the tangent of the same angle C is also approximately equal to $e/(h+t)$ where e is the previously mentioned rightward translational incremental displacement of piston unit 50 due to its angular tilting, and where t is the vertical thickness of the flange portion 38a of the plunger 36a. Thus, the value of angle C can be expressed either as $\tan^{-1} 2(r_2-r_1)/h$ or $\tan^{-1} e/(h+t)$.

When plunger 36a becomes cocked to angle C in response to the application of the force G, the plunger bears with pressure against the sides of its guide hole, and friction is present opposing downward motion of the plunger in its hole. As another matter, the stopping at angle C in the CCW tilting of plunger 36a in its guide hole 35a places an upper limit on the value e of the described rightward incremental displacement undergone by piston unit 50 in the course of its CW angular tilting. That is, the stopping by the guide hole sides of the CCW tilting of plunger 36a in hole 35a serves to stop further CW tilting of unit 50 about pivot point $P_5$ so as to fix the value of e.

Thereafter the plunger 36a acts for unit 50 to stabilize it positionally so that any further movement of the unit 50 in response to application of force G is substantially entirely translational movement in the vertical direction. In such connection, it is to be noted that the pin section 39a of the plunger 36a extends downwardly in the conically tapered tine bore 77a from the inturned tine rim 78a at an outward (i.e., rightward) slant equal to angle C (inasmuch as the pin and rod sections of the plunger are coaxial). Such downward and outward slant of the pin section 39a is matched by an upward and inward slant at angle C of the right wall portion of bore 77a (which accordingly has a taper angle of 2c) so that line contact is made between such wall portion and such pin section. That line contact in proportion to its length serves to stabilize the positioning of the top right part of piston unit 50 by the fixed angular positioning attained by plunger 36a when it becomes fully cocked in its guide hole.

Having discussed what happens on the right-hand side of piston unit 50 upon initial application of the force G, let us now consider what happens on the left side.

The earlier described CW angular tilting of piston unit 50 upon application of force G to right plunger 36a produces not only (as described) an incremental rightward displacement e of right tine 75a but also substantially the same incremental rightward displacement e of the left tine 75b containing the pin section 39b of plunger 36b. That plunger is, as earlier stated, assumed to be initially wholly vertical with the left side 120b of its rod section 37b being in line contact with the left side wall surface 121b of guide hole 35b. As in the case of the right-hand tine and plunger, a rightward incremental displacement of the left tine 75b is communicated to the left plunger 36b to cause CCW angular pivoting thereof with its rod section 37b pivoting within the vertical extent of guide hole 35b.

As one important difference, however, from the pivoting of the plunger on the right side, the rightward displacement of the piston unit 50 is not imparted to the left plunger 36b at the vertical location of the inside rim 78b at the top of tine 75b. Rather, it is imparted to such left plunger by contact between a left side portion, 125b of its pin section 39b and the left inside wall 126b of bore 77b in tine 75b at the vertical location of the arcuate face 86b providing the lower "arm" of the "L" shaped notch opening 85b at the upper end of the tine. That is so because, with rightward displacement of piston 50, the presence of such opening prevents the plunger 36b and tine 75b from contacting each other at a point higher than face 86b for purposes of communicating the incremental displacement of the tine to the plunger. Hence, the place of occurrence of such contact is, in effect, shifted by such opening to a level substantially lower than the top of the tine.

As another important difference between what happens on the left side as compared to that which happens on the right, when the internal rim 78a of right tine 75a is, as earlier described, in pressureless contact with pin section 39a of right-hand plunger 36a (the assumed initial condition obtaining prior to the tilting through angle B of piston 50), the mentioned left side portion 125b of pin section 39a is not simultaneously in pressureless contact with the mentioned wall portion 126b of tine bore 77b. Rather, that pin section portion is initially separated from such wall portion by the sum of two spacings u and w. The first spacing u is equal to the distance by which the inturned rims 78 of the tines 75 project radially into the conically tapered bores thereof from the tops of such bores. The second spacing w is equal to the difference between the radii of the conically tapered tine bore 77b which are present, respectively, at its top and at the level of face 86b. Because of that separation between portions 125b and 126, the tine 75b during its rightward displacement (caused by the tilting of piston 50) must move through the distance of such separation before such displacement of the tine will start to cause any corresponding displacement of the portion 125b of the plunger pin section 39b. Hence, the total displacement of such portion is not e but rather is a lesser amount equal to $e - u - w$.

Apart from the two differences just discussed, the effects of the displacement of unit 50 are, qualitatively speaking, much the same on the left side as on the right in that such displacement is communicated at the level of face 86b from the inner wall portion 126b of the bore of tine 75b to the portion opposite 125b of the pin section 39b of plunger 36b so as to cause CCW angular turning of the plunger about a pivot point $P_8$ located on the left-hand side of guide hole 35b at the top edge of the bounding wall for such guide hole. Such angular turning of course moves the lower part of the rod section 37b of plunger 36b towards making pressure contact with the right bottom edge of the bounding wall for guide hole 36b. As a quantitative difference, however, from what occurs in the case of plunger 36a, the rod section 37b never reaches the right bottom edge of the wall for guide hole 35b to make pressure contact with that edge and, consequently, the plunger 36b remains loose within that guide hole.

Specifically, as the inner bore wall portion 126b of tine 75b contacts, at the level of face 86b, the portion 125b opposite of plunger pin section 39b to drive that portion rightward by the amount $(e-u-w)$, then, as the mentioned pin section portion sweeps through that rightward displacement, the plunger 36 will turn through an angle D of which the value of the tangent is $(e-u-w)/(h+t+y)$ where y is the vertical extent of the notch opening 85b in tine 75b, and h and t have the meanings already defined. Such tangent value however is less than the value $e/(h+t)$ pointed out already as characterizing the angle C at which plunger 36a is fully cocked in its guide hole to be in pressure contact on opposite sides thereof with the top and bottom wall edges of that hole. If, however, as is the case, the tangent of angle D is less than that of angle C, then angle D itself is less than angle C. It follows from this that when, in the circumstances considered, the application of force G causes plunger 36a to be driven through an angle C so as to make pressure and frictional contact on opposite sides of its guide hole with the top and bottom of the guide hole wall, in those same circumstances the application of force G will cause plunger 36b to be driven at most through an angle D which is less than angle C so that plunger 36b will not be forced into pressure frictional contact on opposite sides of its guide hole 36b with the top and bottom of the guide hole wall (although it is possible that plunger 36b might assume a casual pressureless contact of such configuration). Hence, it is the fact that (and in contrast to the heretofore discussed structural configuration shown in FIGS. 1 and 2), the line switch apparatus shown in FIGS. 3-6 cannot be rendered inoperable by jamming of one plunger in its guide hole when downward force is applied exclusively to the other plunger.

Since no such jamming can occur, there is nothing to prevent an increase in the force G to a value greater than $S_0'$ from displacing the piston unit 50 downward. Accordingly, when the force G is so increased, it overcomes (for reasons explained with regard to FIGS. 1 and 2), the friction forces tending to hold the cocked plunger 36a stationary in its hole 35a. Consequently, the plunger 36a is driven downward in its hole to push ahead of it the tine 75a by a making of contact between the annular flange portion 38a of the plunger and the top face 88a of the tine. Such pushing downward of tine 75 results in the downward vertical displacement to the down position shown in FIG. 5 of the whole piston unit 50 of which tine 75a is a part. Such vertical displacement of the piston unit is substantially wholly translational despite the fact that the downward force G is applied at a location which is displaced by a substantial horizontal distance from the vertical symmetry axis of the piston unit.

When the piston unit is so downwardly displaced, the switch contacts 115 in the line switch 100 are actuated as previously described for the case where equal downward forces are applied to the plungers 36a and 36b. In the course of such downward displacement together of the plunger 36a and the piston unit, the plunger remains at the angle C initially assumed thereby while the plunger is slidably being driven down into its hole. Plunger 36 accordingly acts during such displacement to steady the top right part of the floatingly supported piston. Such downward displacement will not, however, cause the angle of plunger 36b in its hole to reach an angle at which normally there is binding of such plunger in such hole. If under abnormal conditions such a binding occurs, the left-hand tine 75b of the piston unit will merely vertically separate from the plunger 36b to permit the piston unit to move vertically downward while the plunger 36b remains stationary in the guide hole 35b. In the course of such downward displacement, the plunger 36b serves to steady the top left part of the floatingly supported piston. Because the plunger 36b is normally unbound, it has some play within its hole 35a to assume various angular alignments therein as, for example, wholly vertical or close to it as shown in FIG. 5.

From the foregoing description, it will be evident that a full downward displacement of piston unit 50 and a consequent normal actuation of the switch contacts 115 can be effected by application of a downward force exclusively to one or the other of plungers 36a and 36b as well as by application of separate equal downward forces concurrently to both of such plungers. Accordingly, the embodiment shown in FIGS. 3-6 is enabled to meet such criterion of commercial acceptability while realizing the already mentioned advantages afforded by such embodiment.

While the foregoing constitutes what is believed to be a reasonable explanation of why the floating piston 50 can be driven downward without jamming by application of downward driving force exclusively to one or the other of the plungers as well as concurrently to both of them, the inventor hereof is bound by the degree of accuracy of such explanation, and the invention is not to be taken as being limited in dependence on such accuracy.

The above described embodiment being exemplary only, it is to be understood that additions thereto, omissions therefrom and modifications thereof can be made without departing from the spirit of the invention. For example, the operation of the invention has been explained on the basis of a particular set of conditions assumed as being present, but due to the floating support of piston 50 and the play of the plungers in their guide holes and in the tine bores, the conditions of positioning and alignment of elements under which the invention will operate properly are not critical. As another example, the structure of the piston unit and the mode by which such unit is force coupled with the plungers and the line switch may depart significantly from that disclosed herein while still being within the ambit of the invention. Accordingly, the invention is not to be considered as limited save as is consonant with the scope of the following claims.

What is claimed is:

1. Apparatus comprising: a telephone stand having a housing with a cradle on its top for a telephone handset, a pair of vertically movable laterally-spaced plungers passing from said cradle through holes in said housing down into its interior, a line switch in said housing below said plungers, vertically movable piston means disposed in said interior between said plungers and switch and adapted by a force coupled relation with each to be driven downward in response to downward driving of said plungers so to actuate said switch, and a pair of coupling means respective to said plungers and coupling them to parts of said piston means to provide guided positioning by said plungers of said parts as said piston means moves vertically in said housing, said pair of coupling means comprising separate parts of said piston means disposed on laterally opposite sides of said piston means and having formed therein respective vertical passages into which are received respective portions of said plungers extending into the interior of said housing.

2. Apparatus according to claim 1 further comprising spring means coupled in said housing to contact a region of said piston means to provide upward floating support therefor, and wherein said respective plunger portions in said passages extend downward to the level of the region of contact of said piston by said spring means.

3. Apparatus comprising: a telephone stand having a housing with a cradle on its top for a telephone handset, a pair of vertically movable laterally-spaced plungers passing from said cradle through holes in said housing down into its interior, a line switch in said housing below said plungers, vertically movable piston means disposed in said interior between said plungers and switch and adapted by a force coupled relation with each thereof, said piston means being responsive to downward driving of either or both of said plungers to undergo a downward displacement operable to actuate said line switch to change switch conditions thereof, reactive means for opposing such downward displacement by exerting on such piston means an upward force adapted when either of said plungers is driven downward without the other being so driven to produce on said piston means a moment of force causing angular tilting in the lateral-vertical plane, and tilt counteracting means precluding jamming by said angular tilting of said downward displacement of said piston means, laterally spaced parts of said piston means having formed therein respective vertical passages in which are received portions of said plungers, and in which such received plunger portions guidably position said parts of said piston means in the course of its vertical movement in said housing.

4. Apparatus according to claim 3 in which each of said vertical passages on laterally opposite sides thereof have respective locations which are inner and outer in relation to the vertical axis of said piston means, and which are the locations adapted to be first contacted on said opposite sides by the plunger portions in said passages upon said angular tilting of said piston means, and in which said inner and outer locations of each of said passages are disposed in relation to each other so that angular binding of either of said plungers in its hole on account of angular tilting of said piston means and consequent plunger-displacing contact between such one plunger and its associated inner location is incapable of producing angular binding of the other plunger in its hole by plunger-displacing contact between the latter plunger and its associated outer location.

5. Apparatus according to claim 3 in which said piston means comprises a horizontal crosshead spanning the lateral spacing between said plungers, a hollow stem extending down from a laterally central region of said crosshead and having spring means extending upward in the hollow of said stem to contact said region, a pair of tubular tines projecting upward from laterally opposite ends of said crosshead and having vertical bores therein in which are received portions of said plungers, and camming means on said stem for actuating said line switch.

6. Apparatus according to claim 5 in which said vertical bores in said tines are convergently tapered in the upward direction.

7. Apparatus according to claim 5 in which each of said tines has an opening formed in the upper end thereof to extend down from the top of such tine and outwardly to the outer side thereof.

8. Apparatus according to claim 5 in which the portions of said plungers which are in said bores extend down at least to the level at which the upper end of said spring means contacts said piston means.

9. Apparatus comprising, a telephone stand having a housing with a cradle on its top for a telephone handset, a pair of vertically movable laterally-spaced plungers passing from said cradle through holes in said housing down into its interior, said plungers fitting in said holes in said housing so as to have angular play therein, a line switch in said housing below said plungers, and vertically movable piston means disposed in said interior between said plungers and switch and adapted by a force coupled relation with each to be driven downward in response to downward driving of said plungers so as to actuate said switch, and a pair of coupling means coupling said plungers to parts of said piston means so as to provide for angular play between said plungers and piston means commensurate with that of said plungers in said holes.

* * * * *

UNITED STATES PATENT AND TRADEMARK OFFICE
CERTIFICATE OF CORRECTION

PATENT NO. : 4,790,008

DATED : December 6, 1988

INVENTOR(S) : Harold L. Bohannon

It is certified that error appears in the above-identified patent and that said Letters Patent is hereby corrected as shown below:

Column 11, line 18, "mutadis" should read --mutatis--.
Column 11, line 56, after "amount" insert --e--.
Column 16, line 50, "adapted by a" should read --adapted to be in--.
Column 16, line 60, "tilting in" should read --tilting thereof in--.

Signed and Sealed this

Eleventh Day of July, 1989

Attest:

DONALD J. QUIGG

Attesting Officer

Commissioner of Patents and Trademarks